United States Patent [19]
Farfaletti-Casali

[11] 3,894,564
[45] July 15, 1975

[54] INSULATION FOR TUBES OR CONDUITS

[75] Inventor: Flaviano Farfaletti-Casali, Milan, Italy

[73] Assignee: European Atomic Energy Community (Euratom), Luxembourg

[22] Filed: Mar. 29, 1971

[21] Appl. No.: 128,932

[30] Foreign Application Priority Data
Apr. 22, 1970  Italy.................................. 50152/70

[52] U.S. Cl. .............................................. 138/155
[51] Int. Cl. ............................................. F16l 59/12
[58] Field of Search.................... 138/155, 140, 149

[56] References Cited
UNITED STATES PATENTS
411,838   1/1889   Springer............................ 138/140
2,101,270   12/1937   Rice............................ 138/155 X Primary Examiner—Jerry W. Myracle
Attorney, Agent, or Firm—Stevens, Davis, Miller & Mosher

[57]   ABSTRACT

A lining preferably for use inside conduits or tubes consisting essentially of interlocking rings, preferably having one which is crown shaped and, which hold elements of insulating material between flanges on adjacent rings. The lining can be inserted into a conduit or tube to protect it from the effects of a high temperature fluid flow.

21 Claims, 3 Drawing Figures

3,894,564

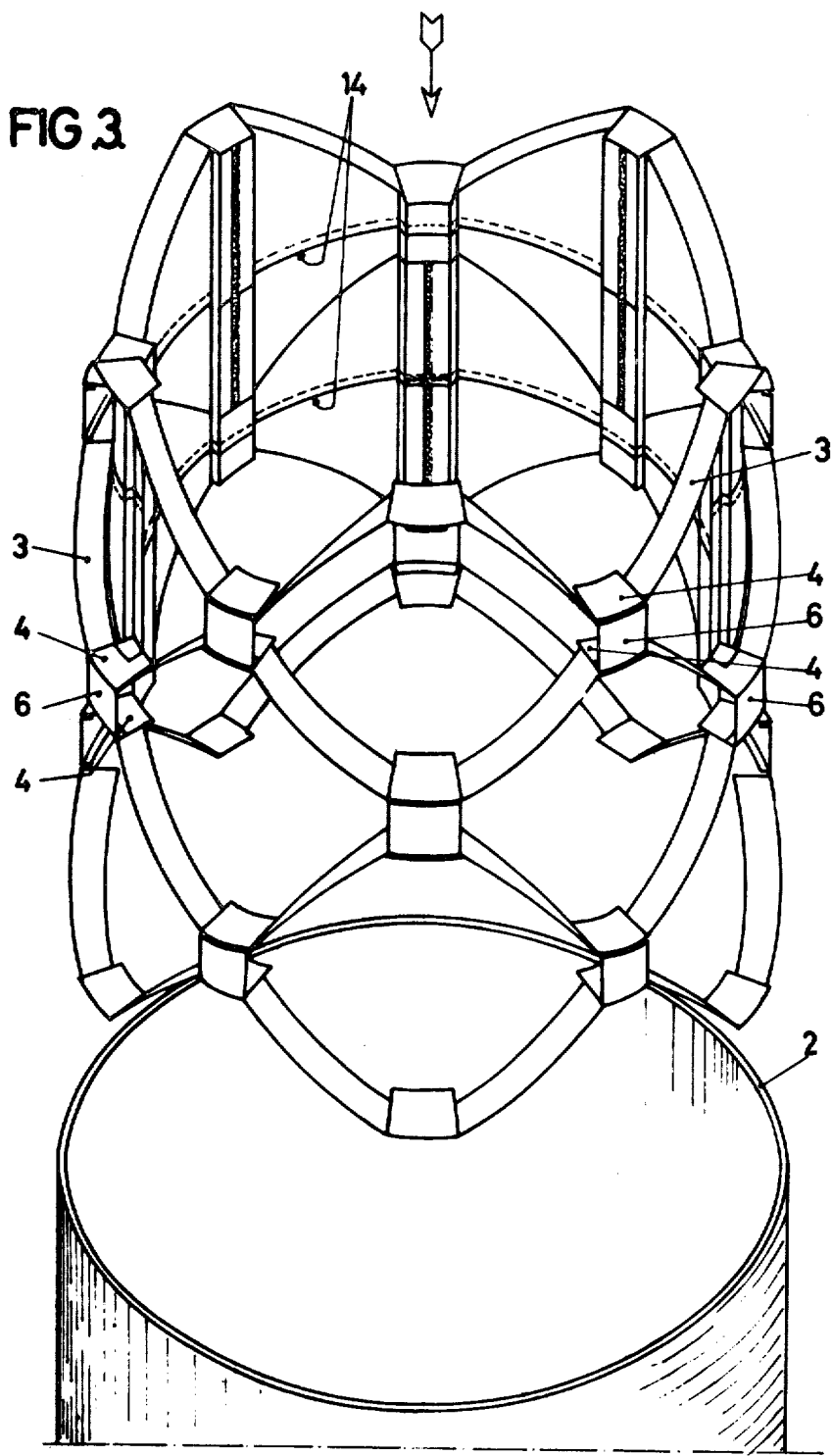

INSULATION FOR TUBES OR CONDUITS

BACKGROUND OF THE INVENTION

1. Field of the Invention

The invention relates to a lining for tubes and conduits, and particularly relates to heat insulation for tubes and conduits through which a gas flows at elevated temperature, for example, tubes for gas conduits in nuclear reactors.

2. Description of the Prior Art

In high temperature gas reactors the primary fluid is as a rule conveyed between the reactor and the heat exchangers via large tubular conduits having diameters of the order of one meter.

The simplest arrangement is that in which the gas flows and returns in two concentric tubes: the high temperature gas (at between 700° and 900°C) coming from the reactor and directed at the heat exchangers flows in the inner tube, such gas returning after being cooled in the outer tubes at a temperature of the order of 300°C. Although there is no particular problem in providing thermal insulation between the cooled return gas and the surroundings, since such insulation can be disposed outside the peripheral tube, there remain difficult problems as regards the behavior of the insulating system between the high temperature gas and the cooled gas, since the insulating system must be disposed inside the central tube, in direct contact with the high temperature gas, to prevent the tube being heated to a temperature which would be excessive for a structural material. The most considerable problems of an insulating system of this kind are due to the following factors: the high operating temperatures, with resulting effects on the properties of the materials used, for example the amount of thermal expansion; the high velocities of the gas in contact with the inner surface of the insulation (speeds higher than 50 m per sec) with the inevitable consequences as regards the shape of that surface, which must have no discontinuities or corrugations normal to the direction in which the gas flows, to avoid excessive load losses, vibrations, and forced infiltrations of gas flows into the insulating system, resulting in reduced insulating properties; possibly high depressurizing speeds from the operative pressures (25–40 atmospheres) of the gas, with resulting effects on the stability of the insulating system, which must not only have satisfactory insulating properties in constant operational conditions, but must also allow rapid decompressions without being damaged.

To obviate the disadvantages outlined above, the invention provides an internal heat insulating system for tubes, although it could also be used on the outside wall of a tube, the system being based on the use of a continuous tubular cladding adapted to allow depressurization and to compensate local differential thermal expansions.

SUMMARY OF THE INVENTION

According to the present invention there is provided a lining for tubes and conduits which comprises a plurality of integral cylinders having adjoining ends, each cylinder having an annular flange on at least one of its ends.

According to another feature of the invention each shaped ring is formed by an assembly of identical elements superimposed along the edges and partly welded to one another.

In another feature of the invention each shaped ring is made more rigid by attaching along its periphery a ribbing formed from a crown-shaped circular rim having the same profile as the crown-shaped ring along the tube axis.

BRIEF DESCRIPTION OF THE DRAWINGS

The heat insulating system according to the invention is illustrated in the accompanying drawings, wherein:

FIG. 3 shows a partial assembly of the structure of the heat insulation adjacent the mouth of the tube.

DESCRIPTION OF THE PREFERRED EMBODIMENTS

Figure 1:
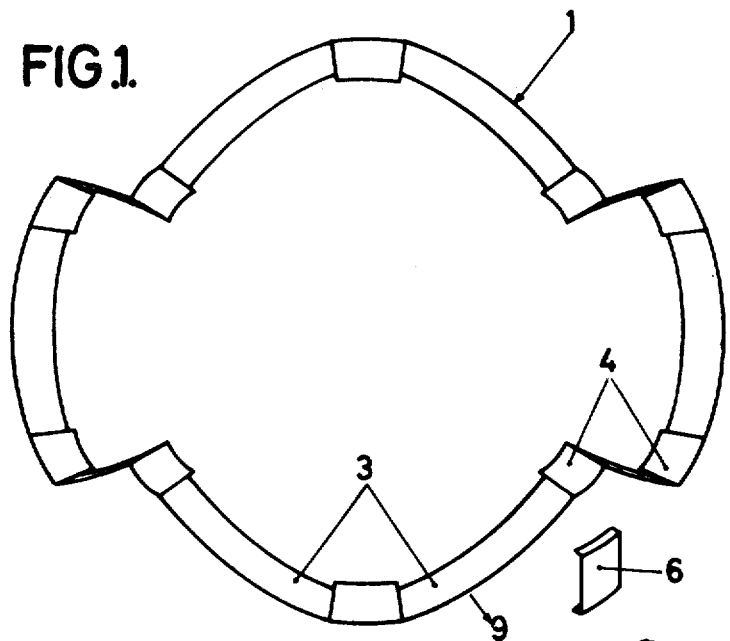
FIG. 1 shows the corrugated circular crown-shaped supporting rim referred to hereinbefore.

As shown in FIG. 1, a sheet of rust-resistant steel having a thickness of the order of 1 mm is cut into corrugated or crown-shaped circular rims 1 having an outside diameter corresponding to the inside diameter of a tube 2 (FIG. 3) in which the insulating system is to be inserted, and having the inside profile of the insulating system itself. The circular rims 1 are the rigidifying ribs of the insulating system according to the invention.

Inclined portions 3 of a rim are disposed in a helix having an inclination of 45° to the axis or generatrix of the tube 2, while flat portions 4 are disposed perpendicularly to the tube axis and act as a connection between adjacent rims and rings. By disposing a number of rings one beside the other (shown in FIG. 3) honeycombing of substantially square section can be formed disposed along the cylindrical surface of the cladding. The honeycombing is filled with fibrous insulating material 5. The number of compartments in the honeycombing disposed over one circumference of the cladding depends on the diameter of the cladding. For instance, for the cladding of a tube having an inside diameter of 600 mm, a succession of five compartments (shown in FIG. 2 and FIG. 3) can be provided, each extending about 220 mm. The corrugated or crown-shaped circular rims 1 are connected to one another by connecting plates 6 formed by square pieces of sheet metal adapted to connect by welding the flat portions 4 of the adjacent crown-shaped rims to the outside of the insulating cladding.

Elements 7, stamped from rust-resistant steel sheet having a thickness of about 0.5 mm, clad the inside of the tubular insulating system. The elements 7, which are spot welded to one another by the superimposition of flanges 8, can be combined to form the complete ring 9. In the ring 9, which represents the portion of cladding between two adjacent corrugated circular rims 1, the elements 7 are so assembled that for each of them the whole central margin 10 is simply superimposed, without being welded to the corresponding zone of the subjacent element. This superimposition of the sheets of metal placed side by side contributes towards making the cladding deformable, enabling differential thermal expansion to be absorbed, while at the same time allowing the insulating system to be depressurized.

The presence of ridges 11, as well as the mere superimposition of the elements 7 corresponding to the zones 10, ensures that the internal cladding is deformable.

The elements 7 are superimposed in the direction in which the gas passes inside the insulation lining. As shown in FIG. 3, the gas circulates downwardly (cf. the arrow) and the adjacent elements 7 are so superimposed as to prevent infiltrations of the gaseous current inside the insulating material. Spot welding is performed along the bent edges 12 of the stamped elements 7 to connect the latter to the inner edge of the crown-shaped circular rims 1.

Figure 2:
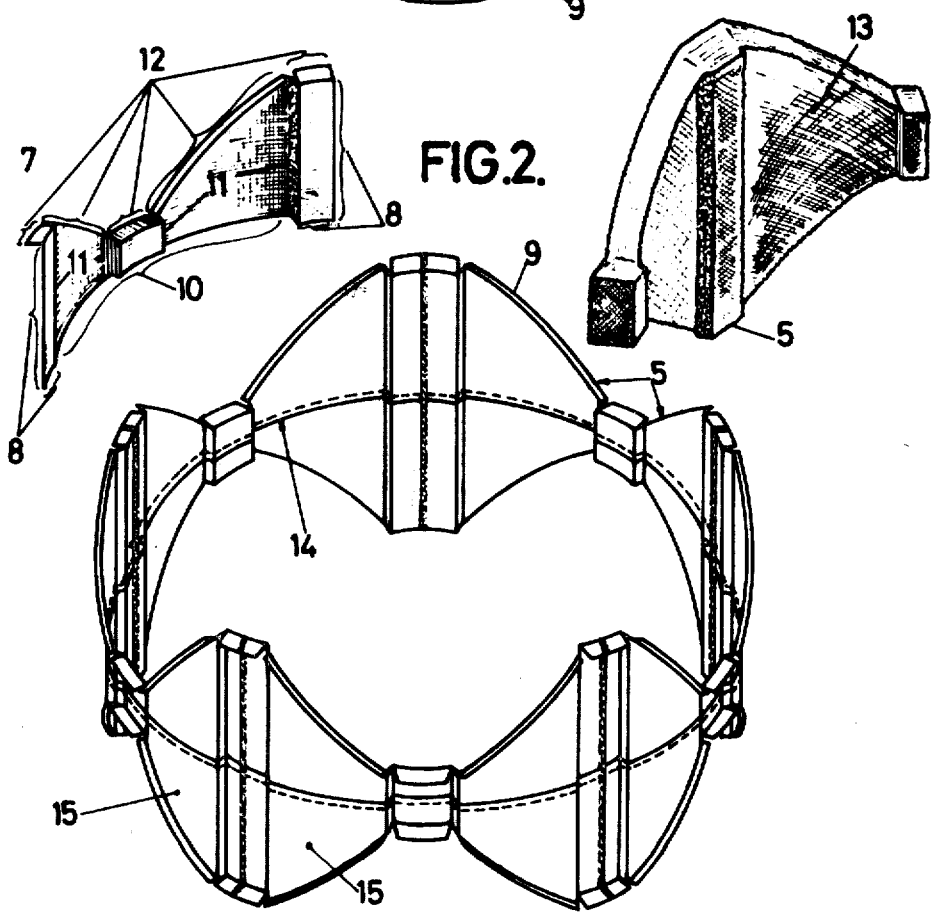
FIG. 2 shows the shaped ring formed by a succession of elements joined together, the element forming the shaped ring, and the element of insulating material.

FIG. 2 shows a member 5 made of fibrous insulating material adapted to fill a compartment in the honey-combing of the insulating system. The element 5 can be made of compressed mineral or ceramic fibers and fits the form of the compartment in which it is to be disposed; it is enclosed by two layers of a rust-resistant steel member 13 of very close mesh. The mesh 13 prevents the fibrous insulating material from being dispersed inside the gas feed tube, passing through the gaps 14 provided along the inner surface of the insulating cladding to enable the gas to be rapidly depressurized. The tubular insulating system is built up as follows: crown-shaped circular rims 1 and crown-shaped rings 9 formed by the stamped plates 7 are placed side by side alternately to make up the surface of the insulating cladding; the elements 7 and the crown-shaped circular rims 1 are then spot welded on the outside along the bent edges 12; the elements 5 of insulating material are placed into their compartments 15 from the outside of the crown-shaped ring.

The structure of the tubular insulating cladding is then completed by externally welding the connecting plate 6 to the crown-shaped circular rims 1 at the portions 4.

In this way tubular insulating systems can be produced of any length which are introduced axially into the gas feed conduits (FIG. 3), and are fixed axially to the tube 2 by welding the free end to the tube to prevent gaseous currents from infiltrating the insulating system.

The afore-described embodiment of the heat insulating system is limited to use in gas tubes of circular section, but other variants and applications can be carried out without exceeding the scope of the invention.

I claim:

1. A lining for tubes and conduits comprising;
   a. a series of integral cylinders having adjoining ends;
   b. each cylinder having a crownshaped circular rim on at least one end;
   c. an insulating material positioned between the circular rims of adjacent cylinders.

2. A lining as claimed in claim 1 wherein the circular rim is disposed to the outside of the cylinder.

3. A lining as claimed in claim 1 wherein each cylinder has a circumsinusoidal end having a crown-shaped circular rim, and the circumsinusoidal ends of adjacent cylinders adjoin with the circular ends of adjacent cylinders superimposed upon one another.

4. A lining as claimed in claim 3 wherein each cylinder is constructed from partly cylindrical elements which comprise a metal plate cut substantially in the shape of two right angled triangles joined at the angle formed between the base and hypoteneuse of each of the triangles.

5. A lining as claimed in claim 4 wherein each cylinder is bounded along the circumsinusoidal edge by a circumsinusoidal rim.

6. A lining as claimed in claim 3 wherein the angle between the base and hypoteneuse of the triangles is 45°.

7. A lining as claimed in claim 1 wherein the series of integral cylinders is bounded by at least one circular rim.

8. A lining as claimed in claim 1 wherein the cylinders have ridges arranged parallel to the axis of the tube or conduit.

9. A lining as claimed in claim 8 wherein the ridges are rectangular in the cross section normal to the axis of the tube or conduit.

10. A lining as claimed in claim 1 wherein the crown-shaped rim is formed from rust-resistant steel.

11. A lining as claimed in claim 1 wherein the insulating material is a compressed fibrous material of the group consisting of mineral and ceramic fibers.

12. A lining as claimed in claim 11 wherein the mineral or ceramic fibers are bounded by rust-resistant steel mesh.

13. A lining for tubes and conduits which lining comprises a series of integral cylinders, each cylinder having a crown-shaped circular rim on one of its ends, each cylinder having its opposite end partly superimposed over a similar end of the adjacent cylinder.

14. A lining as claimed in claim 13 which lining is constructed from rust-resistant steel.

15. The lining of claim 13 in which each cylinder has an annular rim bound to the crown-shaped circular rim.

16. A lining as claimed in claim 13 wherein the end of the cylinder having the circular rim is circumsinusoidal shaped and the opposite end is superimposed on a similar end of the adjacent cylinder.

17. A lining as claimed in claim 16 wherein the angle between the V-shapes is about 45°.

18. A lining as claimed in claim 16 wherein each cylinder is constructed from partly cylindrical elements having the shape of two right angled triangles joined at the angle formed between their bases and their hypoteneuse.

19. An insulated conduit which comprises:
   a. a series of integral cylinders having adjoining ends;
   b. each cylinder having a crownshaped circular rim on one end;
   c. a circular rim having the same shape as the crown-shaped circular rim of the cylinder, each rim being disposed between adjacent crown-shaped circular rims of two cylinders,
   d. a conduit,
   e. an insulating material, the integral cylinders being circumferentially disposed about the conduit to form a compartment to contain the insulating material between the walls of the conduit and the cylinders.

20. A lining for tubes and conduits through which gas passes comprising
   a. a series of integral cylindrical rings having adjacent ends
   b. each cylinder having a crownshaped circular rim on at least one of its ends whereby the cylinders interlock with one another such that an opposite end of the cylinder is superimposed over an end of the cylinder having a circular rim in the direction in which the gas passes so as to prevent infiltration of the gaseous current into the insulating material.

21. A lining as claimed in claim 20 wherein the integral cylindrical rings have a crown-shaped circular rim.

* * * * *